No. 708,535. Patented Sept. 9, 1902.
H. P. DICKINSON.
TIRE TIGHTENER.
(Application filed Mar. 18, 1902.)

(No Model.)

Witnesses

Inventor,
H. P. Dickinson,
By
Attorneys

THE NORRIS PETERS CO., PHOTO-LITHO., WASHINGTON, D. C.

UNITED STATES PATENT OFFICE.

HOWELL P. DICKINSON, OF HURTSBORO, ALABAMA.

TIRE-TIGHTENER.

SPECIFICATION forming part of Letters Patent No. 708,535, dated September 9, 1902.

Application filed March 18, 1902. Serial No. 98,792. (No model.)

*To all whom it may concern:*

Be it known that I, HOWELL P. DICKINSON, a citizen of the United States, residing at Hurtsboro, in the county of Russell and State of Alabama, have invented certain new and useful Improvements in Tire-Tighteners; and I do declare the following to be a full, clear, and exact description of the invention, such as will enable others skilled in the art to which it appertains to make and use the same.

This invention relates generally to improvements in vehicle-wheels, and particularly to improvements in tire-tighteners of that class embodying means for adjusting the length of the spokes and expanding the felly to tightly fit against the expanded or enlarged tire, thereby obviating the necessity of cutting, heating, and shrinking the tire onto the felly in the usual way and providing for the ready and convenient adjustment of the parts to tighten the tire whenever the latter becomes loose.

The object of the invention is to provide simple, strong, durable, and efficient adjusting means whereby the tire may be easily tightened at any time and kept in the best possible running condition, and to so construct such adjusting means that the parts thereof are protected from undue wear by the entrance of dust, grit, or other foreign substances.

With this and other objects in view, which will readily appear as the nature of the invention is better understood, the same consists in certain novel features of construction and combination and arrangement of parts, as will be hereinafter more fully described, defined in the appended claims, and illustrated in the accompanying drawings, in which—

Figure 1:
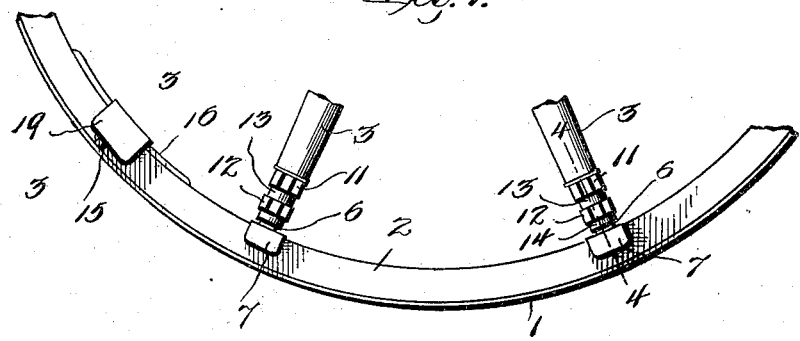
Figure 2:
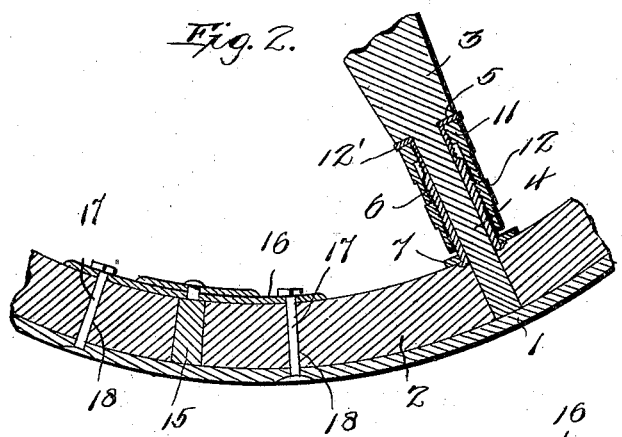
Figure 5:
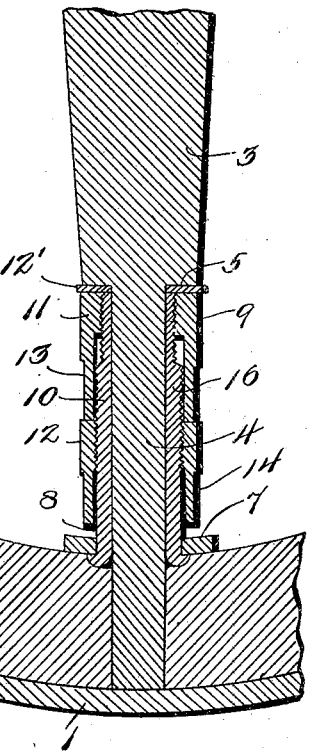
Figure 4:
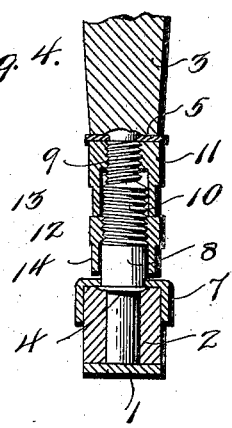
Figure 3:
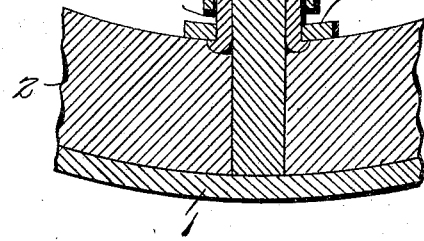

Figure 1 is a side elevation of a portion of a wheel-rim equipped with my invention. Fig. 2 is a longitudinal section through the felly, tire, and adjusting means thereof. Figs. 3 and 4 are cross-sections on the lines 3 3 and 4 4 of Fig. 1. Fig. 5 is a longitudinal section of the spoke-adjusting means, on an enlarged scale, showing the same applied to the outer end of a spoke.

Referring now more particularly to the drawings, the numeral 1 represents the tire, 2 the felly, and 3 the spokes, of a vehicle-wheel of ordinary construction, each spoke being provided, as usual, with a tenon 4, which enters the felly, extending therethrough the full depth of same, and a shoulder 5 at the base of said tenon.

In carrying my invention into practice I provide upon the tenon of each spoke a sleeve or thimble 6, which carries at its outer end a flanged or winged clip or saddle 7, which extends transversely of the felly and bears against the inner surface of the same, with its flanges or wings fitting against the sides of the felly, said clip serving to reinforce the tenon and afford a firmer and more secure connection between the spoke and felly and to diminish liability of lateral deflection of the felly. The sleeve 6 has an outer smooth portion 8 and two threaded surfaces 9 and 10 of different diameters. The smaller or reduced threaded surface 9 is located at the inner end of the sleeve and is formed with right-hand threads, while the larger threaded surface 10 is located between the said two surfaces 8 and 9 and is formed with left-hand threads. Working on the threaded surface 9 is an adjusting-nut 11, and working on the threaded surface 10 is a check or lock nut 12. The nut 11 bears at its inner end against a washer 12, resting on the shoulder 5, and is provided at its outer end with a sleeve 13, which when the nuts are screwed outward covers the exposed threads of the surface 10. The outer end of the nut 12 is similarly provided with a sleeve 14, which covers the exposed threads of the surface 10 when the nuts are so arranged that the nut 12 engages the lower half of said surface. By this construction the threads of the two portions 9 and 10 will at all times be covered irrespective of the position of the nuts by one of the said sleeves, so that access of dust and grit thereto will be prevented and undue wear upon or cutting of the threads obviated.

Whenever it becomes necessary to lengthen the spokes to expand the felly for the purpose of tightening an enlarged tire, this may be easily accomplished by turning the nut 11 to the left to force the sleeve or thimble 6 outward, after which the nut 12 is adjusted inward against said nut 11 to hold the latter against casual rotation. This action of forcing the thimbles 6 outward causes the expansion of the felly 2 and the consequent tightening of the tire, as will be readily understood.

When the felly is expanded in the manner described, it will be apparent that, owing to the increased diameter, the ends of the sections of the felly will be drawn apart or separated, leaving open spaces or joints between them. To close and strengthen each joint, a bushing 15 is inserted therein and is held in place by a bridge-plate 16, which overlaps the joint and bears against the inner surface of the felly. This plate is fastened in position by bolts or rivets 17, passing therethrough and through slots 18, formed in the ends of the felly-sections, which slots permit of a different-sized bushings being inserted, according to the degree of separation of the felly-sections. Wings 19 are formed on the side edges of the bridge-plate to fit against opposite sides of the felly and to prevent lateral movement or deflection of the bushing and ends of the sections joined by the bridge-plate.

From the foregoing description, taken in connection with the accompanying drawings, the construction, mode of operation, and advantages of the invention will be readily understood, and it will be seen that the invention provides a simple and efficient form of tightening means which may be embodied in wheels without materially increasing their cost of manufacture, while saving the cost of repairs whenever tightening of the tire becomes necessary.

Various changes in the form, proportion, and the minor details of construction may be resorted to without departing from the principle or sacrificing any of the advantages of this invention.

Having thus described the invention, what is claimed as new, and desired to be secured by Letters Patent, is—

1. In a tire-tightener, the combination with a tire, felly and spoke, the latter being provided with a tenon entering the felly; of a thimble slidable on said tenon, and engaging the felly and provided with right and left threaded portions of different diameters, an adjusting-nut engaging one of said threaded portions, and a lock-nut engaging the other threaded portion and adapted to hold the adjusting-nut against rotation, said nuts being provided with sleeves for covering the threads of said surfaces exposed by the adjustment of the nuts, substantially as specified.

2. In a tire-tightener, the combination with a tire, felly and spoke, the latter being provided with a tenon entering the felly; of a thimble slidable on said tenon and provided with right and left threaded surfaces, a clip carried by the thimble and embracing the felly, an adjusting-nut engaging one of said threaded portions, and a lock-nut engaging the other threaded portion and adapted to hold the adjusting-nut against rotation, substantially as set forth.

3. In a tire-tightener, the combination with a tire, felly and spoke, the latter being provided with a tenon entering the felly; of a thimble slidable on said tenon and provided with right and left threaded surfaces, a clip carried by the thimble and embracing the felly, an adjusting-nut engaging one of said threaded portions, and a lock-nut engaging the other threaded portion and adapted to hold the adjusting-nut against rotation, said nuts being provided with sleeves for covering the threads of said surfaces exposed by the adjustment of the nuts, substantially as specified.

In testimony whereof I have hereunto set my hand in presence of two subscribing witnesses.

HOWELL P. DICKINSON.

Witnesses:
R. P. SCARBROUGH,
J. M. POLLARD.